United States Patent [19]
Schnorenberg, Jr.

[11] Patent Number: 5,046,404
[45] Date of Patent: Sep. 10, 1991

[54] MAGNETIC DISK BRAKE RETRACTOR

[76] Inventor: Walter H. Schnorenberg, Jr., 4000 Crystie La., Casper, Wyo. 82609

[21] Appl. No.: 615,393

[22] Filed: Nov. 19, 1990

[51] Int. Cl.$^5$ ............................................. F01B 31/00
[52] U.S. Cl. ................................ 92/130 B; 92/130 R; 188/72.3
[58] Field of Search ................ 92/130 R, 130 B, 133, 92/135; 188/72.3, 72.4, 72.5, 370

[56] References Cited

U.S. PATENT DOCUMENTS

| | | | |
|---|---|---|---|
| 2,983,339 | 5/1961 | Neff | 188/72.3 X |
| 3,221,845 | 3/1963 | Hansen | 188/72.3 X |
| 3,470,987 | 10/1969 | Kroeger | 188/72.3 X |
| 3,525,424 | 8/1970 | McCarthy | 188/72.3 X |
| 3,605,958 | 9/1971 | McCarthy | 188/72.3 X |
| 3,665,231 | 5/1972 | Wendler | 188/171 X |
| 3,983,971 | 10/1976 | Kawai | 188/72.3 X |
| 4,067,420 | 1/1978 | Fabris | 188/72.3 X |
| 4,235,311 | 11/1980 | Brinkmann et al. | 188/72.3 X |
| 4,351,423 | 9/1982 | Rogier | 188/72.3 X |
| 4,570,758 | 2/1986 | Hendricks | 188/72.3 |
| 4,609,080 | 9/1986 | Sekella | 188/171 |
| 4,623,044 | 11/1986 | Ohta et al. | 188/72.1 |
| 4,629,039 | 12/1986 | Imoto et al. | 188/72.3 X |
| 4,788,463 | 11/1988 | Layh | 188/72.3 X |
| 4,820,946 | 4/1989 | Gutbrod | 188/72.3 X |

FOREIGN PATENT DOCUMENTS 1182479 11/1964 Fed. Rep. of Germany ..... 188/72.3

Primary Examiner—Edward K. Look
Assistant Examiner—John Ryznic
Attorney, Agent, or Firm—Douglas M. Clarkson

[57] ABSTRACT

A magnetic disk brake retractor is described as having a magnet mounted in the housing of a hydraulic disk brake and adjustable in position relative to a brake piston. In one modification described, the magnet is in the form of permanent magnets. The brake housing is constructed of a non-ferrous substance to prevent degradation of the magnetic field. The magnet is used to exert a force upon the piston to urge the piston to retract when the brake pedal is released. The position of the magnet is adjustable within the brake housing chamber to vary the strength of the magnetic field acting upon the piston and to also mechanically limit the amount of retraction permitted for the piston.

12 Claims, 2 Drawing Sheets

MAGNETIC DISK BRAKE RETRACTOR

BACKGROUND OF THE INVENTION

1. Field of the Invention.

The present invention, generally, relates to hydraulic brake mechanisms and, more particularly, to mechanisms used to retract an actuating piston contained within a hydraulic disk brake mechanism.

Hydraulic disk brake mechanisms are found in use throughout the world today. While hydraulic disk brakes have many advantages over drum type brakes, they are far from consistent in operation.

Often when pressure is removed from the brake pedal, the actuating piston fails to retract sufficiently which, as a result, maintains the brake pad in contact with the rotor disk. This residual contact creates friction, causing an increase in temperature to occur.

The increase in temperature lead to a decrease in braking ability, a phenomenon known as fading. The residual friction also serves to accelerate brake pad wear and increases vehicular fuel consumption.

2. Description of Prior Art

Magnetic releases for friction brakes are already known. For example, U.S. Pat. No. 3,470,987 to Kroeger, that issued Oct. 7, 1969, describes the use of a multiple disk friction brake mechanism, mounted on the end bell of an electric motor. The force exerted by brake applying springs is overcome by energizing a winding.

A device disclosed in U.S. Pat. No. 3,221,845 to Hansen, that issued Dec. 7, 1965, also relies upon a spring actuated braking mechanism for an electric motor. An electromagnet is used to counteract the force of the springs, thereby removing the braking force.

U.S. Pat. No. 4,820,946 to Gutbrod, that issued Apr. 11, 1989, describes an adjustable electromagnetic brake mechanism in which a brake spring applies compressive force to an armature plate and friction discs to apply a braking force. An electrical coil creates an electromagnetic force on an armature plate in a direction to release the brake.

U.S. Pat. No. 4,623,044 to Ohta et al, that issued Nov. 18, 1986, describes a brake mechanism utilizing the change in dimension of a piezoelectric member, when a voltage is applied, to develop additional braking force, rather than to withdraw braking force.

U.S. Pat. No. 4,605,104 to Thompson, that issued Aug. 12, 1986, describes an actuating mechanism that relies upon elastic properties, rather than magnetic, to assist in the retraction of the brake actuator.

U.S. Pat. No. 4,662,483 to Boeck, that issued May 5, 1987, describes a disc brake retractor mechanism with compression springs to assist in the retraction of the braking apparatus.

U.S. Pat. No. 4,629,039 to Imoto et al, that issued Dec. 16, 1986 describes an alternate braking apparatus using a piezoelectric device.

U.S. Pat. No. 4,067,420 to Fabris, that issued Jan. 10, 1978, describes a disc brake mechanism with an electromagnetic release mechanism.

While the structural arrangements of these prior art devices at first appearance have similarities with the device of the present invention, they differ in material respects. These differences, which will be described in more detail hereinafter, are essential for the effective use of the invention and which admit of the advantages that are not available with the prior devices.

OBJECTS AND SUMMARY OF THE INVENTION

It is an important object of the invention to provide a disc brake retractor for a hydraulic system that is readily adaptable to existing hydraulic disc brake mechanisms.

It is also an object of the invention to provide a disc brake retractor for a hydraulic brake system that utilizes magnetic flux as the motive force.

Another object of the present invention is to provide a means of adjusting the position of the magnetic disc brake retractor as contained within the disc brake housing.

Still another object of the present invention is to provide mechanical means to limit the amount of retraction permitted for the piston within the brake housing.

Yet another object of the present invention is to provide pulsed electromagnetic means to limit the amount of retraction permitted for the piston within the disc brake housing.

It is a further important object of the present invention to provide an electromagnet as the means of generating the magnetic flux.

A still further object of the present invention is to provide a means within the master cylinder to limit the amount of retraction permitted for the piston within the brake housing.

Briefly, a disc brake retractor that is constructed in accordance with the principles of the present invention embodies at least one permanent magnet encased in a housing that does not readily conduct magnetic flux. An actuating piston is constructed of ferrous material and, therefore, is continually attracted towards the permanent magnet.

When the brake pedal is depressed, the resulting hydraulic pressure overcomes the magnetic attraction, and the actuating piston is urged away from the permanent magnet and toward brake pads. When the brake pedal is released, hydraulic pressure is removed from the system, and the magnet exerts a force on the actuating piston that attracts the actuating piston towards the permanent magnet. Retracting the actuating piston eliminates residual contact between the brake pads and the rotor disc resulting in the advantages described above. In a modification, the permanent magnet is replaced by an electromagnet that is energized for a time interval immediately following operator release of the brake pedal.

The above and other objects, advantages and features of the present invention will become more readily apparent from the following detailed description of the presently preferred embodiments as illustrated in the accompanying drawings.

DETAILED DESCRIPTION OF THE INVENTION

Figure 1:
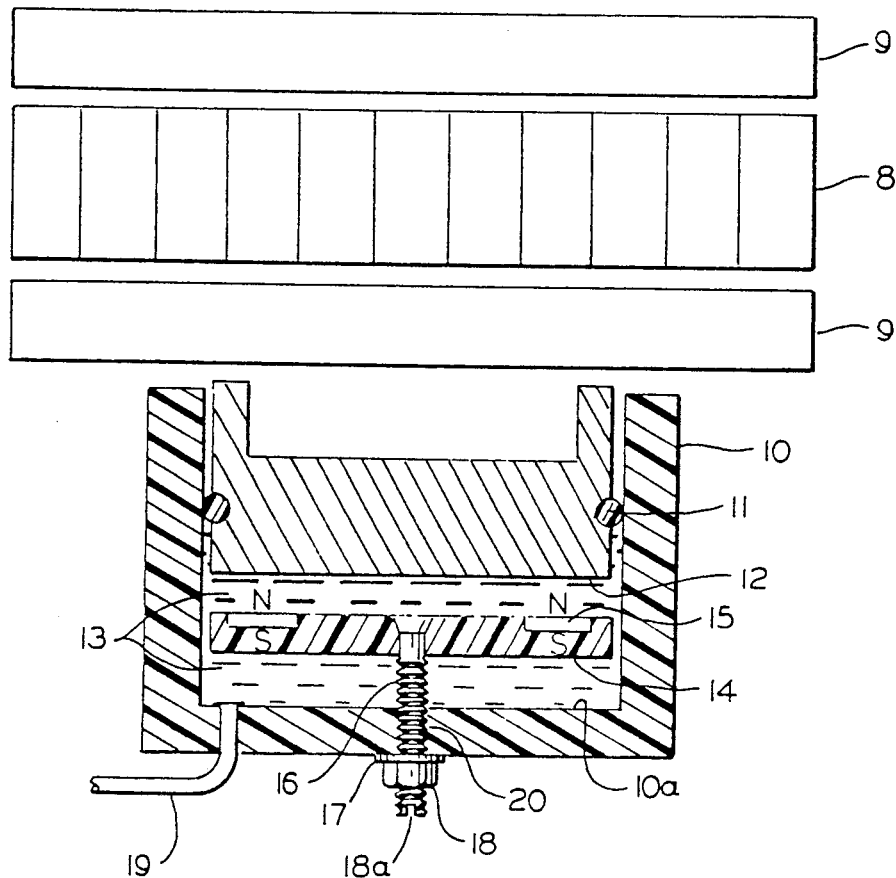
FIG. 1 is a view in cross section of a hydraulic disc brake mechanism illustrating a magnetic disc brake retractor within a brake housing in accordance with the invention.

Referring now to FIG. 1, a conventional set of brake pads 9 and rotor 8, are shown. When the brake pedal (not shown) is depressed, additional brake fluid (not shown) flows through the brake line 19 and enters the chamber 13 of the brake housing 10. The brake fluid entering the chamber 13 is able to freely flow around the captive adjustable magnetic plate 14 which does not contact the chamber 13 walls.

As hydraulic pressure within the chamber 13 increases, the piston 12 is urged forward into contact with the brake pads 9 which, in turn, bear upon the rotor 8. The piston 12 contains a seal 11 to prevent brake fluid from escaping from the brake housing in the space located between the piston 12 and the interior surfaces of the brake housing 10. Contact between the brake pads 9 and the rotor 8 create friction in proportion to the hydraulic pressure applied, thereby removing rotational energy from the system and slowing rotation of the rotor 8 and whatever is connected thereto.

Figure 2:
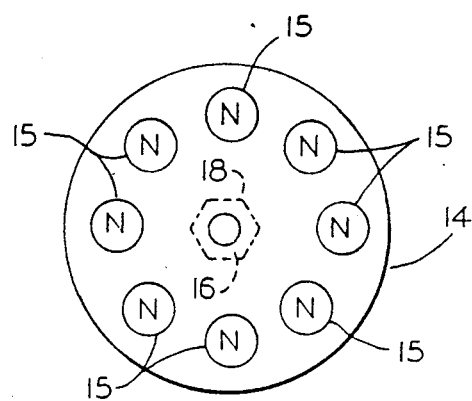
FIG. 2 is a plan view illustrating a permanent magnetic plate of the magnetic disc brake retractor.

Referring to FIG. 2, the captive adjustable magnetic plate 14 is shown in detail, which contains a plurality of permanent magnets 15, each of which is secured to the captive adjustable magnetic plate 14. Each permanent magnet 15 is oriented with the magnetic polarity running in the same, or parallel, direction. The resultant magnetic flux field generated is a relative summation of the magnetic flux of each of the permanent magnets 15 embedded in the captive adjustable magnetic plate 14.

Each permanent magnet 15 is secured to the captive adjustable magnetic plate 14. Any number of permanent magnets 15 may be present in the captive adjustable magnetic plate 14 to achieve the magnetic force desired.

Referring back to FIG. 1, the captive adjustable magnetic plate 14 is adjusted and secured by a threaded rod 16 which passes through the brake housing 10. An O-ring 17 and lock nut 18 secure the captive adjustable magnetic plate 14 in the position desired. The threaded rod 16 is coated with a suitable thread sealant 20 to prevent brake fluid seepage from occurring.

The piston 12 is constructed of a suitable ferrous material, such as steel. This ensures that the magnetic flux emanating from the captive adjustable magnetic plate 14 shall exert a magnetic retraction force upon the piston 12. The brake housing 10 is optimally constructed of non-ferrous or minimally ferrous material, such as aluminum or stainless steel so as to preserve and maximize the strength of the magnetic field present between the piston 12 and the captive adjustable magnetic plate 14. In certain applications, the brake housing 10 may be constructed of ferrous composition providing that a sufficient amount of magnetic force is present to retract the piston 12.

It is described hereinabove how increasing hydraulic pressure urges the piston 12 away from an operative position in proximity with the captive adjustable magnetic plate 14 and into contact with the brake pad 9. As is well known to those skilled in the art of disk brake mechanisms, the entire disk brake assembly is permitted to slide along a dovetail mounting arrangement, thereby dividing the pressure as exerted by each brake pad 9 equally on both sides of the rotor 8.

When hydraulic pressure is removed from the system, such as when the brake pedal is released, the magnetic force field of the captive adjustable magnetic plate 14 urges the piston 12 back to a retracted position closer to the captive adjustable magnetic plate 14. The magnetic force applied serves to retract the piston 12 thereby ensuring that it does not continue to bear upon the brake pads 9.

When pressure is removed from the brake pads 9, which are permitted to "float", the continued rotation of the rotor 8 urges the brake pads 9 away from a position of contact with the rotor 8. This reduces the amount of residual friction present in the brake system, thereby producing the benefits described hereinabove.

Figure 4:
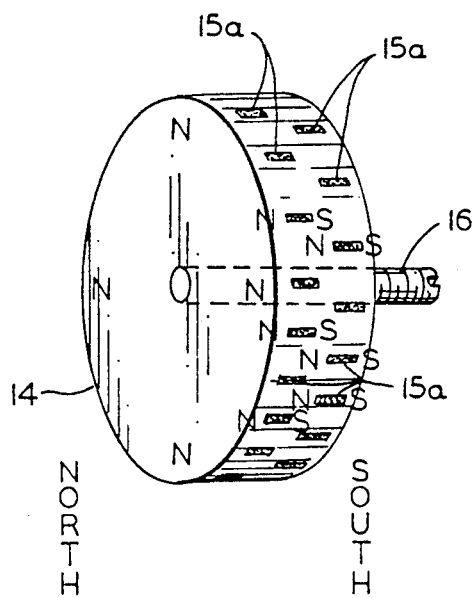
FIG. 4 is a perspective view illustrating an alternate construction for a permanent magnetic plate for the magnetic disc brake retractor.

Referring now to FIG. 4, an alternate means is shown for constructing the captive adjustable magnetic plate 14 of the present invention. As shown the body of the captive adjustable magnetic plate 14 is constructed of a suitable substance, such as bakelite or plastic, providing a substance that is resistant to degradation from continuous contact with brake fluid. The substance used must also be tolerant of the range of hydraulic pressures to which it will be exposed.

For the purpose of example only, and not intended by way of limitation, the material bakelite will be used in the following description. During the formation of the bakelite captive adjustable magnetic plate 14, small permanent magnetic particles 15a are mixed into suspension with the viscous bakelite solution as the captive adjustable magnetic plate 14 assembly is being formed.

A very strong external magnetic field is applied and induced throughout the solution during the time interval required for the bakelite solution to set. The strong external magnetic field applied in this manner serves to orient the permanent magnetic particles 15a uniformly within the bakelite solution in the north-south polar direction. The external magnetic field applied is of sufficient strength to produce this orientation of the permanent magnetic particles 15a.

The size, shape, and density of the permanent magnetic particles 15a, the strength of the magnetic field, and the viscosity of the solution, are varied and controlled to prevent significant and undesirable migration of the permanent magnetic particles 15a from occurring within the solution while it is curing. The physical orientation of the permanent magnetic particles 15a is preserved after the bakelite solution has cured into a solid. The threaded rod 16 is set into the bakelite solution and, therefore, becomes a part of the captive adjustable magnetic plate 14 when it has cured into a solid.

The result is an alternate means of constructing the captive adjustable magnetic plate 14 which radiates a uniform permanent magnetic field of the strength desired. The same process employed in the formation of the bakelite adjustable magnetic plate 14 is applicable for use with plastics, fiberglass resins, and other substances.

Figure 3:
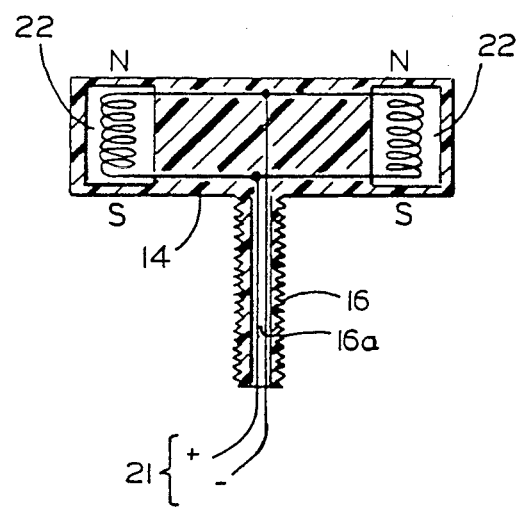
FIG. 3 is a cross section view illustrating an alternate construction of an electromagnetic plate for the magnetic disc brake retractor.

Referring to FIG. 3, an alternate means of constructing the captive adjustable magnetic plate 14 is shown using a plurality of electromagnets 22 securely contained within the adjustable magnetic plate 14. The threaded rod 16 is constructed as a cylinder with an internal shaft 16a. The internal shaft 16a provides a means to route the electrical wires 21 to and from the electromagnets 22. In this embodiment the electromagnets 22 are energized, or pulsed, immediately after the brake pedal (not shown) is released.

Referring now to FIG. 1 and FIG. 3, the duration necessary to activate the electromagnets 22 is a variable that is determined by several factors as they relate to each application. For example, varying the duration during which the electromagnets 22 are energized is useful as a means to control the amount of retraction by the piston 12. If the electromagnets 22 are energized for a short time duration, the piston 12 will retract only a limited amount, because the magnetic force will only be present for a limited period.

The time of energization selected for the electromagnets 22 is sufficient to cause the proper amount of retraction of piston 12 necessary to eliminate any residual friction in the system, while not causing the piston 12 to retract an excessive amount. It is desirable to limit the amount of retraction of the piston 12 in order to prevent an excessive amount of brake pedal depression from being required the next time the brakes are to be applied. Additional means to limit the amount of retraction of the piston 12 shall hereinafter be described.

The electromagnets 22 may be energized periodically under the control of a computer (not shown) or timer (not shown) to ensure the retraction of the piston 12. The magnetic retraction and electromagnetic retraction processes are compatible for use with conventional computer controlled anti-lock braking systems and will, in many cases, increase the efficiency of these systems.

Referring to FIG.'s 1, 2, 3, and 4, it is possible to permanently establish the position of the captive adjustable magnetic plate 14 within the brake housing 10 during manufacture, providing sufficient magnetic force is present to continue to urge retraction of the piston 12 as the brake pads 9 wear. As the brake pads 9 wear, the piston 12 is continually being moved to a relative position further away from the captive adjustable magnetic plate 14, thereby resulting in a decrease of the magnetic retraction force being applied to the piston 12 in accordance with well known laws of magnetism.

However, the preferred method of installation for the captive adjustable magnetic plate 14 within the brake housing 10 allows for adjustment of the position of the captive adjustable magnetic plate 14 with respect to the piston 12.

The use of a threaded rod 16 passing through the brake housing base plate 10a, which is secured in its desired position by tightening of the lock nut 18, serves as the preferred means of adjustment of the captive adjustable magnetic plate 14 within the brake housing 10. A slot 18a is formed in the end of the threaded rod 16 to facilitate adjustment of the position of the captive adjustable magnetic plate 14 by permitting a flat blade screwdriver to be inserted into the slot 18a to turn the threaded rod 16 after the lock nut 18 has been loosened. After adjustment of the captive adjustable magnetic plate 14 has been completed, the lock nut 18 is tightened to prevent any additional rotation of the threaded rod 16 from occurring.

When adjusted, the captive adjustable magnetic plate 14 is held in a fixed position relative to the brake housing base plate 10a. The captive adjustable magnetic plate 14 is adjusted to control the density of the magnetic field affecting the piston 12 and, therefore, the magnetic force exerted upon the piston 12. Well known laws of physics state that the magnetic force experienced by a ferrous object is indirectly proportional to the square of the distance between the permanent magnet 15 and, in this case, the piston 12.

As the captive adjustable magnetic plate 14 is adjusted closer to the piston 12, the magnetic force of attraction increases according to the reciprocal of the square of the distances involved. Because it is not possible to machine the surfaces involved perfectly smooth, the distance between the piston 12 and the permanent magnets 15 can never become zero, even when the two surfaces are in direct contact with one another. If the distance between the permanent magnets 15 and the piston 12 were equal to zero, an infinite magnetic force of attraction would be present, and it would therefore become impossible to separate the piston 12 apart from the permanent magnets 15.

Accordingly, when the brake pedal is depressed, the increase in hydraulic pressure being exerted by the brake fluid upon the piston 12 is always able to overcome the magnetic force present, thereby urging the piston 12 to move toward the brake pads 9 and away from the permanent magnets 15. To those now skilled in the art, it will be apparent that adjusting the captive adjustable magnetic plate 14 is useful as a means to increase the magnetic retraction force acting upon the piston 12 when desired. The captive adjustable magnetic plate 14 is adjusted when the brake system is new, when the brake pads 9 wear, and when the brake pads 9 are replaced. For similar reasons, when electromagnets 22 rather than permanent magnets 15 are used, the captive adjustable magnetic plate 14 is also adjusted.

Adjustment of the position of the captive adjustable magnetic plate 14 is also useful as a means to mechanically limit the amount of retraction experienced by the piston 12. The maximum amount of retraction which the piston 12 may experience is limited to the point where contact with the captive adjustable magnetic plate 14 has occurred. Therefore the position of the captive adjustable magnetic plate 14 is adjusted to establish and to limit the maximum amount of retraction of the piston 12.

Figure 5:
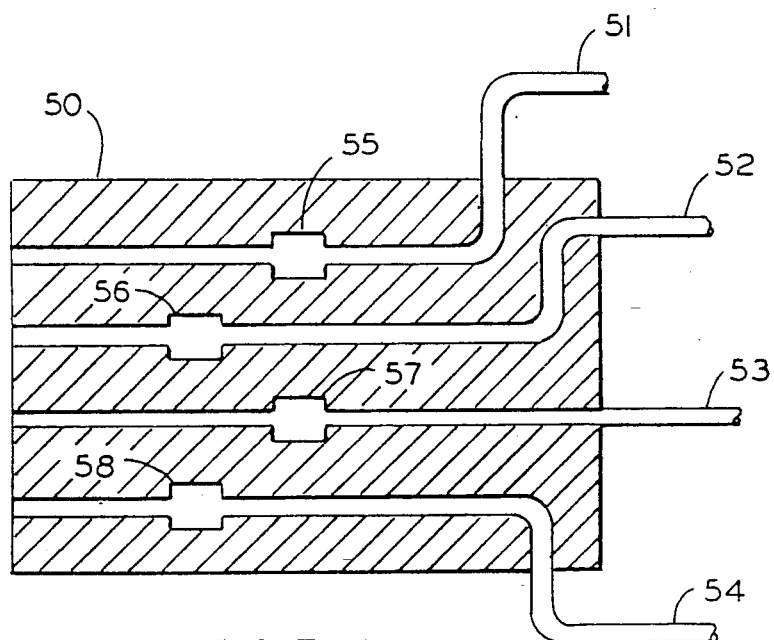
FIG. 5 is a block diagram illustrating the functioning of the modification made to a master cylinder for limiting the amount of retraction of the actuating piston in a hydraulic disc brake system.

While referring to FIG. 1, and to FIG. 5, a simplified block diagram is shown of the modified portion of a master cylinder 50. A separate brake line is used to supply brake fluid to each active hydraulic brake assembly. The right-front brake line 51 supplies fluid to the right-front brake assembly. The left-front brake line 52 supplies fluid to the left-front brake assembly. The right-rear brake line 53 supplies fluid to the right-rear brake assembly. The left-rear brake line 54 supplies fluid to the left-rear brake assembly. Any number of separate hydraulic circuits may be employed as there are active hydraulic brake assemblies.

A right-front brake circuit metering valve 55 limits the amount of brake fluid returning to the master cylinder 50 from the right-front brake assembly and, therefore provides an alternate means of limiting the amount of retraction of the right-front brake piston 12 as contained in the brake housing 10. A separate brake circuit metering valve 56, 57, 58 is used in conjunction with each of the other brake lines 52, 53, 54 to limit the amount of brake fluid returning from each respective brake line back to the master cylinder 50.

Each brake circuit metering valve 55, 56, 57, 58 permits an unrestricted flow of brake fluid as needed to each brake assembly. Therefore, braking ability is not diminished. However, each brake circuit metering valve 55, 56, 57, 58 is designed to allow only a limited amount of brake fluid to return to the master cylinder from each brake assembly; thereby limiting the amount of retraction of the piston 12 in each respective brake housing 10.

As the flow of brake fluid to the brake assembly is not restricted, an alternate means is provided whereby automatic adjustment preserving the amount of retraction by each piston 12 is accomplished. As each brake pad 9 individually wears, the piston 12 must move further away from the brake housing base plate 10a in order to produce the same braking force upon the now worn brake pad 9. The amount of brake fluid returning is limited by each brake circuit metering valve 55, 56, 57, 58 always limiting the amount of retraction of the piston 12 regardless of the relative position of the piston 12 resulting from brake pad 9 wear.

The invention has been shown, described, and illustrated in substantial detail with reference to the presently preferred embodiments thereof. If will be understood by those skilled in this art that other and further changes and modification may be make without departing from the spirit and scope of the invention which is set forth in the claims appended hereto.

What is claimed is:

1. In a hydraulic brake mechanism, the combination comprising:

a housing for enclosing a piston, a chamber for hydraulic fluid, and means to connect said chamber with a source of hydraulic fluid; and magnetic means within said chamber for urging said piston in a predetermined manner.

2. The hydraulic brake combination described by claim 1 wherein said magnetic means is in the form of a permanent magnet.

3. The hydraulic brake combination described by claim 1 wherein said magnetic means is in the form of a plate to support a plurality of permanent magnets.

4. The hydraulic brake combination described by claim 1 wherein said magnetic means is in the form of an electromagnetic for urging said piston in a retracted position.

5. The hydraulic brake combination described by claim 3 wherein said plate to support a plurality of permanent magnets includes means to adjust the location of said magnets relative to said piston.

6. The hydraulic brake combination described by claim 5 wherein said means to adjust the location of said magnets relative to said piston includes threaded bolt means.

7. The hydraulic brake combination described by claim 1 wherein said housing is formed of a material that is non-magnetic.

8. The hydraulic brake combination described by claim 1 wherein said magnetic means is in the form of a permanent magnetic, and said permanent magnet is supported by means to adjust its position relative to said piston.

9. The hydraulic brake combination described by claim 8 wherein said housing is formed of a material that is non-magnetic.

10. The hydraulic brake combination described by claim 9 wherein said permanent magnet is in the form of a plurality of individual permanent magnets supported on means adjustable in position relative to said piston, and said adjustable means is in the form of threaded bolt means.

11. The hydraulic brake combination described by claim 9 wherein said piston is movable between an operable position and a retracted position, and said brake combination includes means to limit the amount of travel said piston makes between said two positions.

12. The hydraulic brake combination described by claim 2 wherein said permanent magnet is in the form of a plate of a non-magnetic material with a plurality of magnetizable particles embedded therein magnetized to form a larger permanent magnet.

* * * * *